United States Patent [15] 3,673,306

Kirkpatrick [45] June 27, 1972

[54] FLUID HEAT TRANSFER METHOD AND APPARATUS FOR SEMI-CONDUCTING DEVICES

[72] Inventor: Milton E. Kirkpatrick, Palos Verdes Peninsula, Calif.

[73] Assignee: TRW Inc., Redondo Beach, Calif.

[22] Filed: Nov. 2, 1970

[21] Appl. No.: 89,091

Related U.S. Application Data

[63] Continuation of Ser. No. 764,468, Oct. 2, 1968.

[52] U.S. Cl. .......................... 174/15 R, 165/105, 174/DIG. 5
[51] Int. Cl. .......................... H01k 1/12
[58] Field of Search .......................... 174/14, 15 R, 15 C, 16 R, 17, 174/DIG. 5; 165/32, 105

[56] References Cited

UNITED STATES PATENTS

| | | | |
|---|---|---|---|
| 2,958,021 | 10/1960 | Cornelison et al. | 165/105 X |
| 3,563,309 | 2/1971 | Basiulis | 165/32 X |
| 3,405,299 | 10/1968 | Hall et al | 165/105 X |
| 3,517,730 | 6/1970 | Wyatt | 174/15 R UX |
| 3,222,557 | 12/1965 | Meacham et al. | 174/15 R UX |
| 3,452,147 | 6/1969 | Narbut et al. | 174/16 R |
| 3,400,543 | 9/1968 | Ross | 174/15 R X |

OTHER PUBLICATIONS

G. Y. Eastman, The Heat Pipe, Scientific American, May 1968, pp. 38–46
Hackh's Chemical Dictionary, 3rd Edition, Blakiston, pp. 624 (QD 5 H3 1944 C19)

*Primary Examiner*—Lewis H. Myers
*Assistant Examiner*—A. T. Grimley

[57] ABSTRACT

There is disclosed the use of a heat pipe type thermal conductive path within a metallic housing such as a transistor can for a highly efficient cooling of high power semi-conductor devices which normally require large heat dissipation. An electrically non-conductive wick structure is provided which is formed, for example, from high purity silica glass cloth in a shape resembling a hollow "marshmallow" and which forms a liner for the entire transistor can. The wick contacts both the active surface of the semi-conductor device in the bottom of the can and the upper walls of the can. Prior to placing the can upon its mounting base, an appropriate amount of electrically non-conductive, non-polar working fluid such as high purity organic liquid is loaded so that it entirely fills or saturates only the wick like structure. The working fluid held within the wick is thus in immediate contact with the active surface of the semi-conducting device. In operation, the surface of the semi-conductor device serves as the evaporator section of the closed loop heat pipe. As fluid is caused to evaporate from this region, heat transfer and thus cooling of the device is effected. The vapor thus produced is recondensed over regions of the can which are at slightly cooler temperatures than the semiconductor device. The working fluid vapor thus provides an efficient heat transfer path to the entire radiating surface of the can in order to dissipate the thermal energy of concern.

7 Claims, 3 Drawing Figures

Milton E. Kirkpatrick
INVENTOR.

BY

ATTORNEY

FLUID HEAT TRANSFER METHOD AND APPARATUS FOR SEMI-CONDUCTING DEVICES

CROSS-REFERENCES TO RELATED APPLICATIONS

This application is a streamlined continuation of application Ser. No. 764,468, filed Oct. 2, 1968.

BACKGROUND OF THE INVENTION

1. Field of the Invention

This invention is in the field of heat dissipation for high power semi-conductor devices and utilizes a heat pipe to achieve this end with maximum efficiency.

2. Description of the Prior Art

Many different approaches have been taken to the problem of dissipating the heat generated by electronic components adapted to handle high power levels and thus give rise to significant heat dissipation problems. Numerous thermally conductive materials have been used either as mounting washers, encapsulation materials or the like. Typical of such art are the U.S. Pats. bearing the following Nos. 2,990,497; 3,157,828; 3,181,034; 3,182,115; 3,199,257; 3,328,642; 3,351,698.

Although the "heat pipe" has been under rapid development recently, it has not heretofore been utilized in such heat transfer arrangements as the prior art has shown for cooling of electronic components. Broadly speaking, however, the concept and art of building reflux boilers is well developed and dates back to papers on the subject during the 1930's. A "heat pipe" works on the principle of a reflux boiler and is extremely efficient in terms of transferring large thermal heat fluxes. Examples of heat pipe devices are described in U.S. Pats. No. 3,152,774 and No. 3,229,759, respectively. The basic heat pipe is a closed tube which has a layer of porous wick material attached to the interior surface of the tube wall. The tube or pipe is partially filled with a fluid, the specific fluid being determined by the temperature range desired, which wets the porous wick material and spreads throughout the wick material by capillary forces.

When a sufficient heat flux is applied to any point on the surface of the pipe, liquid will be vaporized. Energy equivalent to the heat of vaporization is carried away from the high heat flux region by the vapor that migrates throughout the interior region of the pipe. The vapor will recondense on any and all interior surfaces which are at temperatures slightly below that of the vaporizing surface, thereby giving up the heat of vaporization to all cooler surfaces.

The recondensed fluid is then transported by capillary forces back to the vaporization region, or high heat flux input zone, to continue the closed loop process of transporting and delivering thermal energy to any and all cool regions of the pipe. As a result of this action, the heat pipe, when properly designed, although heated only in one small region, quickly becomes an isothermal surface; that is, all surface temperatures on the pipe are equal or nearly equal no matter what the distribution of heat flux input may be.

It is thus seen that the heat pipe concept involves two basic principles. The first principle involved is simple boiling heat transfer, whereby thermal energy is effectively transferred through the latent heat of the vaporization of a substance. The heat transfer takes place via the vapor phase with the latent heat given up during the condensation process at some surface distant from the point of thermal input. Such vapor heat transfer processes can be made extremely efficient, resulting in an effective thermal conductivity several orders of magnitude greater than the thermal conductivity of materials such as silver or copper. The second basic principle involved in a heat pipe is that of capillary flow of the working fluid through a wick like structure from the condensor region back into the boiler region. These two principles when combined to form a heat pipe, result in a closed loop heat transfer process which can operate for extremely long periods of time without significant degradation in the heat transfer efficiency of the device.

SUMMARY OF THE INVENTION

The present invention utilizes the advantages of heat pipe structures in the relatively small housings for electronic components. In particular a wick like substance is used to form a liner for a transistor can, the wick contacting the upper surface of the transistor mounted in the bottom of the can and also contacting all heat dissipating walls of the can. A working fluid saturates the wick so that it functions as a small heat pipe.

The primary advantage of the heat pipe concept for cooling solid state devices is the ability of the vapor to remove heat directly from the transistor surface even though that surface may not be in direct contact with a thermal conducting mounting washer or can wall. Boiling heat transfer has the potential of removing several hundred watts of thermal energy per square centimeter when an effective vapor condensation and heat removal process from the condenser region is provided. In a conventional transistor package, heat removal is accomplished by conducting heat through not only the thickness of the transistor itself, but also through several intermediates including beryllium oxide, solder, and metallic studs and fins. The dissipation of thermal energy by such solid state conduction processes is directly dependent upon the total temperature gradient between the heat source and heat sink. Effective heat dissipation requires a reasonably large temperature differential between these points. In the heat pipe concept, however, no significant temperature differential is required and heat is effectively dissipated to its environment at very nearly the same temperature as the heat source. Vapor motion caused by pressure differential transports heat. This ability to operate without substantial temperature gradients is then one of the primary features which account for the heat pipe's ability to dissipate substantially larger quantities of thermal energy to the environment than can a process involving only thermal conduction through a series of solids.

Another advantage of the heat pipe device comes from the fact that under equilibrium conditions of a two phase liquid-vapor interface, there is produced a truly isothermal region over all interface surfaces. This ability to operate as an isothermal device affords extremely important operational improvements in solid state electronic devices by essentially unifying the temperature over large area transistor surfaces and thus eliminating temperature gradients. As a result of the elimination of temperature gradients the stability and performance of high power, high frequency solid state devices can be substantially improved.

It thus is an object of this invention to provide an improved heat transfer apparatus and method for cooling electronic components.

It is a further object of this invention to provide such a method and device which can more efficiently dissipate larger quantities of heat than has been true of prior art devices.

It is a further object of this invention to provide such a method in apparatus which will achieve its heat transfer at very slight temperature differentials and which can maintain the surface of an electronic component at a uniform temperature or isothermal condition.

BRIEF DESCRIPTION OF THE DRAWING

These and other objects and advantages are obtained in the manner discussed in greater detail below in connection with the drawings wherein.

DESCRIPTION OF THE PREFERRED EMBODIMENT

Figures 1, 2, 3:
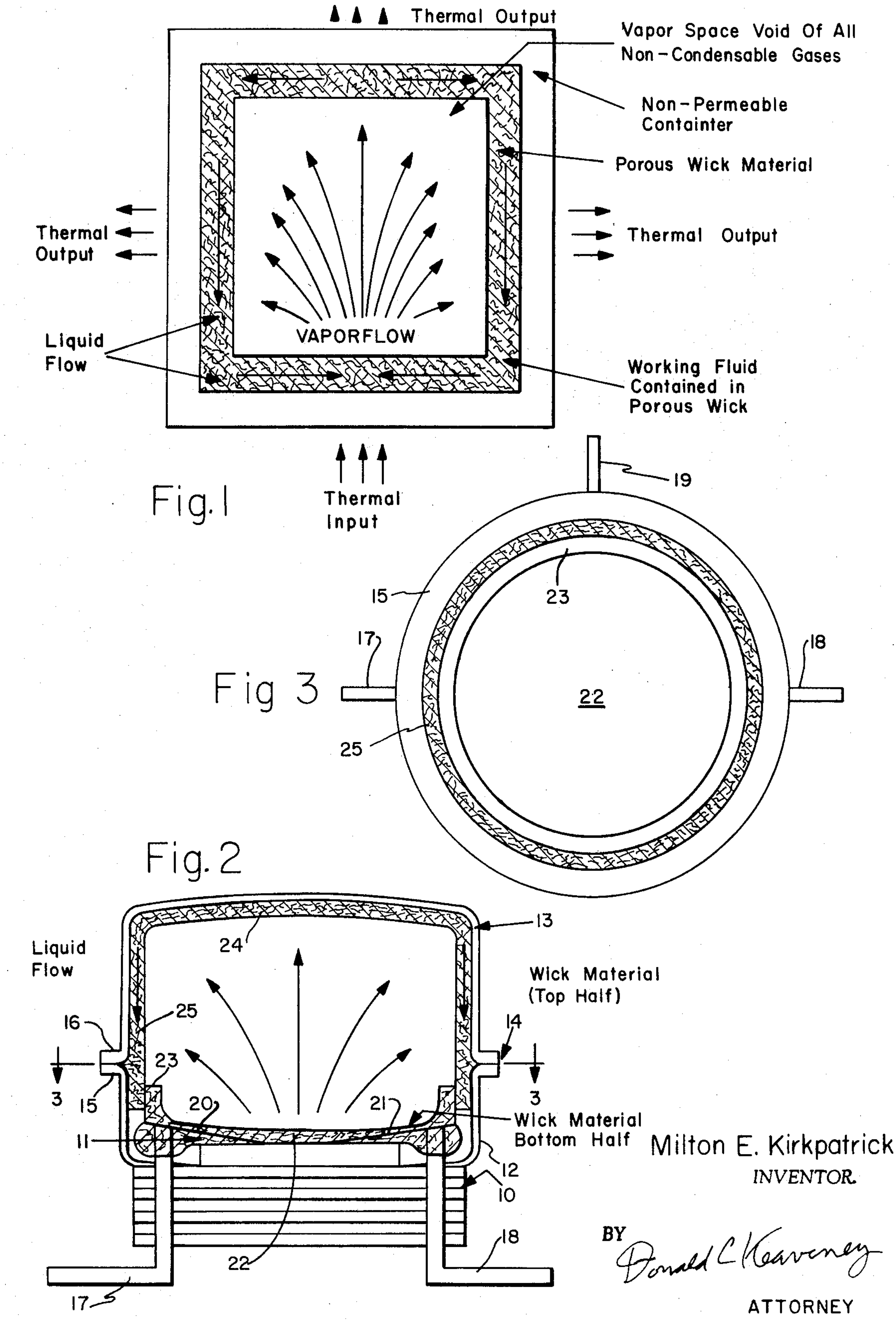
FIG. 1 is a schematic diagram illustrating the operation of a conventional heat pipe.
FIG. 2 is a sectional view of a transistor and transistor can containing a two piece wick system forming a heat pipe for cooling the transistor.
FIG. 3 is a sectional view taken on the line 3—3 in FIG. 2.

In Fig. 1 there is shown in cross section a schematic view of a basic heat pipe positioned within a non-permeable heat conductive container. The container has all of its inner surfaces lined with a porous wick material. The simplicity of the principle of operation of such a device is apparent. The working fluid is contained within the wick structure and is vaporized by a source of thermal energy which may be incident upon any surface region of the container but which is shown in FIG. 1 as being incident upon the bottom surface of the heat pipe container. The vapor which is generated at the point of thermal input by the source of thermal energy leaves the wick structure and enters the interior vapor space which is preferably devoid of all non-condensable gases. As the vapor contacts other interior walls by condensation upon the wick structure, the latent heat of vaporization carried by the vapor is imparted to the wick and thus the container walls. The rate of vapor condensation at such points of contact and thus, the heat transfer rate, is determined by the temperature of the wall or exterior surface. As any interior surface is heated to temperatures exceeding neighboring surfaces, the relative deposition rate of vapor to those surfaces is automatically regulated by thermal equilibrium requirements such that all surfaces approach ideal isothermal conditions. The vapor condenses to a liquid and is transported through the wick structure by capillary forces to the region of thermal input. An example of the direction of vapor flow and the direction of return liquid flow are indicated by the appropriate arrows in FIG. 1 as are the areas of thermal input and thermal output resulting from the boiling and condensation cycle. This self-regulating, closed loop process is then the heat pipe process in its simplest form.

The manner in which this process is used to provide cooling for a semi-conductor device is illustrated in FIGS. 2 and 3. In these figures there is shown a power transistor mounted in a housing. The mounting arrangement includes a beryllium oxide mounting base 10 which affords mechanical support and good thermal conductivity for the transistor device 11 while at the same time serving as an electrical insulator. Attached to the beryllium base 10 is the lower half 12 of a metallic transistor can which also includes an upper half 13. The upper half 13 is joined to the lower half 12 at its bound line 14 in a manner which is conventional in the art. This bonding is preferably achieved by joining together a protruding lip 15 on the lower portion of the can and a corresponding protruding lip 16 on the upper portion of the can. Transistor leads 17, 18 and 19 are connected through the beryllium oxide base to provide terminals within the transistor can to which wires from the active regions of the transistor device 11 may be attached as at 20 and 21.

Above the upper surface of the transistor device 11 is a first wick member 22 which is generally cup shaped as shown having a lower surface entirely covering the upper surface containing the active regions of the transistor and having an upwardly extending annular lip 23 which is designed to make contact with the wick liner 24 in the upper half of the can. The wick liner 24 not only covers the entire upper surface of the can but also has an annular downwardly extending portion 25 which protrudes below the bond line of the can and which has an inner diameter substantially equal to the outer diameter of the lip 23 on the wick for the lower half member. The two wick members are thus in friction contact with each other so that liquid flow through them is afforded a continuous path.

The wick structure is preferably made from high purity silica glass cloth formed in the marshmallow like shape shown in the drawing. More generally, the wick should be relatively thin and should have a high thermal conductivity in order to avoid significant temperature gradients across its thickness. Additionally, of course, it must be an electrical insulator so as not to short the surface of the semi-conductor device 11 to the metallic can structure. Within these two requirements essentially any suitable wick material may be used.

The wick structure fits snugly within the conventional can structure typically used in packaging semi-conductor devices. Prior to placing the can upon the base, an appropriate amount of working fluid which may be any compatible high purity organic liquid having the desired thermal characteristics for the operating device under consideration is loaded into the wick in such a fashion that it entirely fills the wick structure. Excess fluid will in practice accumulate in the voids around the transistor leads entering through the beryllium oxide base beneath the lower wick.

Upon placing the can on the base holding the solid state device, the device is arranged so that at least its upper or active surface is mechanically contacted by the wick structure. If desired, the wick can also be snugly fitted around the sides of the device to contact the beryllium oxide base.

In operation, the active surface of the semi-conductor device serves as the evaporator section of the closed loop heat pipe. Heat from the bottom of the transistor device is of course conducted away through the beryllium oxide base in the conventional manner. As heat from the upper active surface of the transistor device causes fluid to evaporate from this region, heat transfer and thus cooling of the device is effected. The vapor produced is recondensed over the other regions of the can walls which are at slightly cooler temperatures than the base thereby releasing the latent heat of vaporization to be dissipated away through the can walls. The vapor flow to these walls is indicated by the arrows in FIG. 2.

A variety of fluids is feasible for this cooling cycle. For example, fluids such as pentane can be produced in extremely high purity form thus minimizing the danger of contamination of the semi-conductor device. In addition to its purity, pentane is a single chain molecule which is not polar and therefore is not affected by regions of high electric field near a device interface. Pentane has a boiling point of 36.1° C. and therefore is extremely effective in transferring thermal energy in the range just above room temperature. It will of course be understood, however, that pentane is cited merely as one preferred example and that various fluids or combinations of fluids may be used depending upon the particular thermodynamic characteristics desired for any given application.

It has been assumed that all non-condensable gases are removed from the can. Alternatively, however, the control of the amount of non-condensable gases within the heat pipe vapor chamber and the control of the direction of heat flow, when coupled, can provide overall temperature regulation and control of the heat pipe cooling system. This is as a result of the non-condensable gases being forced by the directional flow of the working vapor toward the condenser region of the heat pipe. If the condenser surface is prepared such that heat is dissipated effectively at the extreme end portion and less effectively over the regions intermediate between the boiler and condenser, the non-condensable gases serve as a buffer or barrier at lower temperature and essentially isolate the working vapor from the high heat dissipation condenser surface. Since the temperature within the heat pipe is a result of the thermal balance between the heat source and the heat sink, the presence of non-condensable gases reduces the flow of heat to the heat sink. As the temperature rises, and thus the vapor pressure of the working fluid rises, the volume of non-condensable gases is decreased. As this volume decrease proceeds, with rising temperature, a point is reached whereby the condenser surface having high heat dissipation is made available to the working vapor. This result in effect, changes the thermal balance at this point in temperature. As the temperature continues to rise, more and more heat dissipating surface becomes available to the working fluid thus, serving as a temperature control.

The device described above provides one structure for achieving a unique cooling method which allows improved performance of high power semi-conducting devices since temperature gradients are minimized across the surface of the device. As in the case of beryllium oxide, which is conventionally used for cooling, this closed loop evaporation-condensation cycle provides high thermal conductivity, (in fact a thermal conductivity greatly exceeding that of beryllium oxide) while maintaining electrical isolation between the other metallic components of the container and the device itself.

Another advantage of this method is that under equilibrium conditions of its two phase liquid-vapor interface, there is produced a truly isothermal region over all interface surfaces. This ability to operate as an isothermal device provides extremely important operational improvements in solid state electronic devices by essentially unifying the temperature over large area transistor surfaces, thus, eliminating temperature gradients and as a result substantially improving the stability and performance of high power high frequency solid state devices. It can be seen from the structure described above that conventional materials of construction can be employed and that by varying the size and shape of the external metal container enclosing the transistor the thermal balance and thus the operating temperature can be adjusted at will. The wick structure for containment and transfer of the working fluid in its liquid state is in contact with all interior surfaces of the container including the surface of the solid state device. It will be noted that the wick directly contacts the surface of the transistor, thereby maintaining a film of the working fluid on the transistor surface at all times. By vaporization of the working fluid from this liquid film, heat is removed directly from the surface of the solid state device thereby producing extremely efficient cooling across the transistor surface at all times. In addition, the liquid film in contact with the transistor surface which is in equilibrium with its vapor, will by its very nature, maintain ideally uniform or isothermal temperatures across the device. The heat pipe device thus results in substantial improvement in the overall performance and power levels which can be maintained by any given transistor.

For any particular transistor and can configuration, one should first determine from among the several available non-polar fluids the optimum fluid both from the standpoint of device compatibility and heat pipe performance. One should also consider from the wide range of wick materials which are available, those which appear to be most suitable for meeting a particular transistor cooling need at lowest cost. This selection is based both on the wicking ability of the material as well as the workability of the material in the production situations. Also, the wick structure should be capable of functioning in a thin layer and should have high thermal conductivity in order to avoid large temperature gradients across the thickness of the wick. Finally, using the optimum materials thus selected, one can determine the increased power levels which are possible from the application of boiling heat transfer or heat pipe cooling and thereby determine the desired uniform temperature over any given device surfaces as well as the effects of temperature uniformity on the operating characteristics of the particular solid state device. From these considerations one can arrive at a detailed heat pipe transistor can design for the particular transistor device under consideration.

While a specific preferred embodiment of the invention has been described by way of illustration only, it will be understood that the invention is capable of many other specific embodiments and modifications and is defined solely by the following claims.

What is claimed is:

1. A package for a heat generating solid state electronic device having an active surface wherein heat is generated during operation of said device, comprising:

a. base means to mechanically support said device at regions removed from said active surface;
b. heat dissipating cover means forming with said base means a closed container housing said device and forming a vapor space adjacent to said device;
c. electrically non-conductive capillary means on the interior surfaces of said container and in direct contact with the entire active surface of said solid state electronic device, said capillary means forming a closed flow path through which liquid may flow by capillary action; and
d. an electrically non-conductive, non-polar working fluid in said capillary means, said working fluid having a boiling point such that it is evaporated from said active surface of said solid state electronic device to form a vapor which flows to the interior surfaces of said heat dissipating cover means and is there recondensed to a fluid whereby heat is transferred from said solid state electronic device by the latent heat of vaporization of said fluid to ultimately be dissipated from said cover means.

2. The invention according to claim 1, wherein said solid state device is a semiconductive device.

3. The invention according to claim 2, wherein said solid state device is a transistor.

4. The invention according to claim 1, and further including a quantity of non-condensable gas within said container, said non-condensable gas causing the volume of vapor space and the interior surface area of said heat dissipating cover means that is exposed to said vapor to change, in response to temperature change, in a manner to oppose the temperature change.

5. A package for heat generating solid state electronic device having an active surface wherein heat is generated during operation of said device, comprising:

a. thermally conductive and electrically insulating base means to mechanically support said device and to conduct heat away from another surface thereof that is spaced from said active surface;
b. heat dissipating cover means forming with said base means a container housing said device and forming a vapor space adjacent to said device;
c. an electrically non-conductive heat pipe wick structure in contact with said active surface of said solid state device and in contact with the interior walls of said container; and
d. an electrically non-conductive, non-polar working fluid in said wick structure and in direct contact with said entire active surface, whereby boiling heat transfer utilizing the latent heat of vaporization of said working fluid that is vaporized by the heat dissipated from said active surface results in cooling of said solid state device, said wick structure serving to return working fluid condensate from the dissipating walls of said container to the heat generating active surface of said solid state device.

6. Apparatus as in claim 5 wherein said wick material consists of silica glass.

7. Apparatus as in claim 5 wherein said vaporizable substance is pentane.

* * * * *